(12) United States Patent
Saito et al.

(10) Patent No.: US 8,382,642 B2
(45) Date of Patent: Feb. 26, 2013

(54) VEHICLE CONTROL APPARATUS

(75) Inventors: Tatsuya Saito, Chiryu (JP); Takashi Satoh, Okazaki (JP); Yosuke Ohmori, Kariya (JP); Masayoshi Takeda, Kariya (JP)

(73) Assignees: Denso Corporation, Kariya (JP); Advics Co., Ltd., Kariya (JP)

( * ) Notice: Subject to any disclaimer, the term of this patent is extended or adjusted under 35 U.S.C. 154(b) by 165 days.

(21) Appl. No.: 13/087,836

(22) Filed: Apr. 15, 2011

(65) Prior Publication Data

US 2011/0256980 A1 Oct. 20, 2011

(30) Foreign Application Priority Data

Apr. 15, 2010 (JP) ................................. 2010-094397

(51) Int. Cl.
*B60W 10/04* (2006.01)
(52) U.S. Cl. ....................................................... 477/185
(58) Field of Classification Search .................. 477/185, 477/203, 901
See application file for complete search history.

(56) References Cited

U.S. PATENT DOCUMENTS

| 6,346,064 | B1 * | 2/2002 | Hada et al. ................... 477/171 |
| 6,347,608 | B1 * | 2/2002 | Hara et al. .................. 123/179.4 |
| 6,754,579 | B2 * | 6/2004 | Kamiya et al. ............... 701/112 |
| 7,043,354 | B2 * | 5/2006 | Braun et al. .................. 701/113 |
| 2002/0028726 | A1 | 3/2002 | Morimoto et al. |
| 2003/0004635 | A1 | 1/2003 | Kamiya et al. |
| 2011/0256981 | A1 * | 10/2011 | Saito et al. .................... 477/183 |

FOREIGN PATENT DOCUMENTS

| JP | A-2003-13768 | 1/2003 |
| JP | B2-3684965 | 8/2005 |
| JP | B2-4051870 | 2/2008 |

* cited by examiner

*Primary Examiner* — Dirk Wright
(74) *Attorney, Agent, or Firm* — Oliff & Berridge, PLC (57) ABSTRACT

A vehicle control apparatus includes: an automatic-stop-and-restart-control-unit stopping/restarting an engine, a brake-fluid-pressure-control-unit controlling wheel-cylinder-pressure using a brake-system, which intensifies brake-manipulation-force by a brake-booster to cause master-cylinder-pressure in a master-cylinder while the engine operates, and which transfers the master-cylinder-pressure to wheel-cylinders to cause the wheel-cylinder-pressure, the brake-system including an actuator automatically increasing pressure in the wheel-cylinders irrespective of the brake-manipulation-force; a negative-pressure-detection-unit which detects the vacuum-pressure; a first-determination-unit which determines whether the vacuum-pressure is not more than a first threshold while the engine stops, a restarting-unit which allows the automatic-stop-and-restart-control-unit to restart the engine when the first-determination-unit determines that the vacuum-pressure is not more than the first threshold; a second-determination-unit which determines whether the vacuum-pressure is not more than a second threshold; and a braking-boost-unit which allows the brake-fluid-pressure-control-unit to automatically increase the pressure in the wheel-cylinders when the second-determination-unit determines that the vacuum-pressure is not more than the second threshold.

6 Claims, 4 Drawing Sheets

VEHICLE CONTROL APPARATUS

CROSS-REFERENCE TO RELATED APPLICATION

This application is based on and claims the benefit of priority from earlier Japanese Patent Application No. 2010-094397 filed Apr. 15, 2010, the description of which is incorporated herein by reference.

BACKGROUND OF THE INVENTION

1. Technical Field of the Invention

The present invention relates to a vehicle control apparatus that performs idle stop control (hereinafter referred to as "IS control") under which an engine (internal combustion engine), i.e. a drive source of travel, is stopped when predetermined conditions are met to perform idle stop.

2. Related Art

In a braking system, a pedal pressure, which is a pressure caused when a brake pedal is pressed by a driver, is intensified by a servomechanism to cause high pressure in a master cylinder (this pressure is hereinafter referred to as "M/C pressure"). The M/C pressure is then transferred to each wheel cylinder to cause high pressure in the wheel cylinder as well (this pressure is hereinafter referred to as "W/C pressure") for the generation of high braking force. A brake booster of an intensification-with-negative pressure type may correspond to such a servomechanism for intensifying a pedal pressure, such a brake booster uses the negative pressure caused by an intake stroke of an engine. The negative pressure is introduced into the brake booster (this pressure introduced into the brake booster is hereinafter referred to as "vacuum pressure") and used for intensifying the pedal pressure.

Meanwhile, a control system for automatically stopping and restarting an engine has been known. This control system is adapted to automatically stop an engine when the driver makes an attempt to stop the vehicle, thereby improving fuel consumption. As mentioned above, a brake booster uses the negative pressure caused by an intake stroke of an engine. When such a brake booster is used in the control system for automatically stopping and restarting an engine, the negative pressure for the booster is decreased when the engine is stopped, resulting in decrease of the braking force.

In order to suppress decrease of braking force, JP-A-2003-013768 suggests a technique in which an engine is restarted as the vacuum pressure is decreased. Specifically, in this technique, combinations of a vacuum pressure and a braking operation are stored in advance. When it is estimated that a combination of a negative pressure and a braking operation is likely to decrease the vacuum pressure, the engine is ensured to be restarted. Restart of the engine can again guarantee the vacuum pressure to thereby suppress decrease of the braking force.

However, an engine may be stopped under the IS control not only when the vehicle is stopped but also when the vehicle is decelerated. In the latter case, since the vehicle is still moving, the driver may attempt to adjust the vehicle speed to a desired speed depending on the conditions of the road surface, such as of a downward slope, on which the vehicle travels. Therefore, the driver may frequently operate the brake before the vehicle is stopped. The driver's frequent brake operation may decrease the vacuum pressure.

In such a case, the engine may be restarted by detecting the decrease of the vacuum pressure by detecting the fact that the vacuum pressure has become equal to or lower than a threshold. Alternatively, the engine may be restarted by predicting the decrease of the vacuum pressure. However, restart of an engine in these manners may invite a response delay. Specifically, it may take time from when the engine is restarted until when the vacuum pressure is guaranteed, leading to difficulty in suppressing decrease of braking force.

Another measure that may be taken against the decrease of the vacuum pressure may be to restart the engine at an earlier stage in preparation for the response delay. In this case, however, the frequency of performing idle stop is lowered and thus the effect of improving fuel consumption will not be well exerted.

Further, when an engine is restarted by a starter, it sometimes happens that the engine may not be normally restarted (e.g., restart of the engine may be delayed). In this case, vacuum pressure is not generated for intensifying the pedal pressure. As a result, the braking force may no longer be suppressed from being decreased.

SUMMARY OF THE INVENTION

An embodiment provides a vehicle control apparatus which can suppress decrease of braking force due to the decrease of vacuum pressure in the case where an engine is stopped under idle stop control (IS control) not only when the vehicle is stopped but also when the vehicle is decelerated.

As an aspect of the embodiment, a vehicle control apparatus includes: an automatic stop and restart control unit which stops and restarts an engine of a vehicle; a brake fluid pressure control unit controlling wheel cylinder pressure by using a brake system, which intensifies brake manipulation force by a brake booster to cause master cylinder pressure in a master cylinder while the engine is in operation, the brake booster generating vacuum pressure, and which transfers the master cylinder pressure to wheel cylinders to cause the wheel cylinder pressure, the brake system including an actuator which automatically increases pressure in the wheel cylinders irrespective of the brake manipulation force; a negative pressure detection unit which detects the vacuum pressure; a first determination unit which determines whether or not the vacuum pressure detected by the negative pressure detection unit is equal to or less than a first threshold while the engine is stopped; a restarting unit which allows the automatic stop and restart control unit to restart the engine when the first determination unit determines that the vacuum pressure is equal to or less than the first threshold; a second determination unit which determines whether or not the vacuum pressure detected by the negative pressure detection unit is equal to or less than a second threshold; and a braking boost unit which allows the brake fluid pressure control unit to automatically increase the pressure in the wheel cylinders when the second determination unit determines that the vacuum pressure is equal to or less than the second threshold.

DETAILED DESCRIPTION OF THE PREFERRED EMBODIMENTS

With reference to the accompanying drawings, hereinafter is described an embodiment of the present invention. It should be appreciated that, throughout the specification and the drawings, identical or uniform components are designated with the same references.

Figure 1:
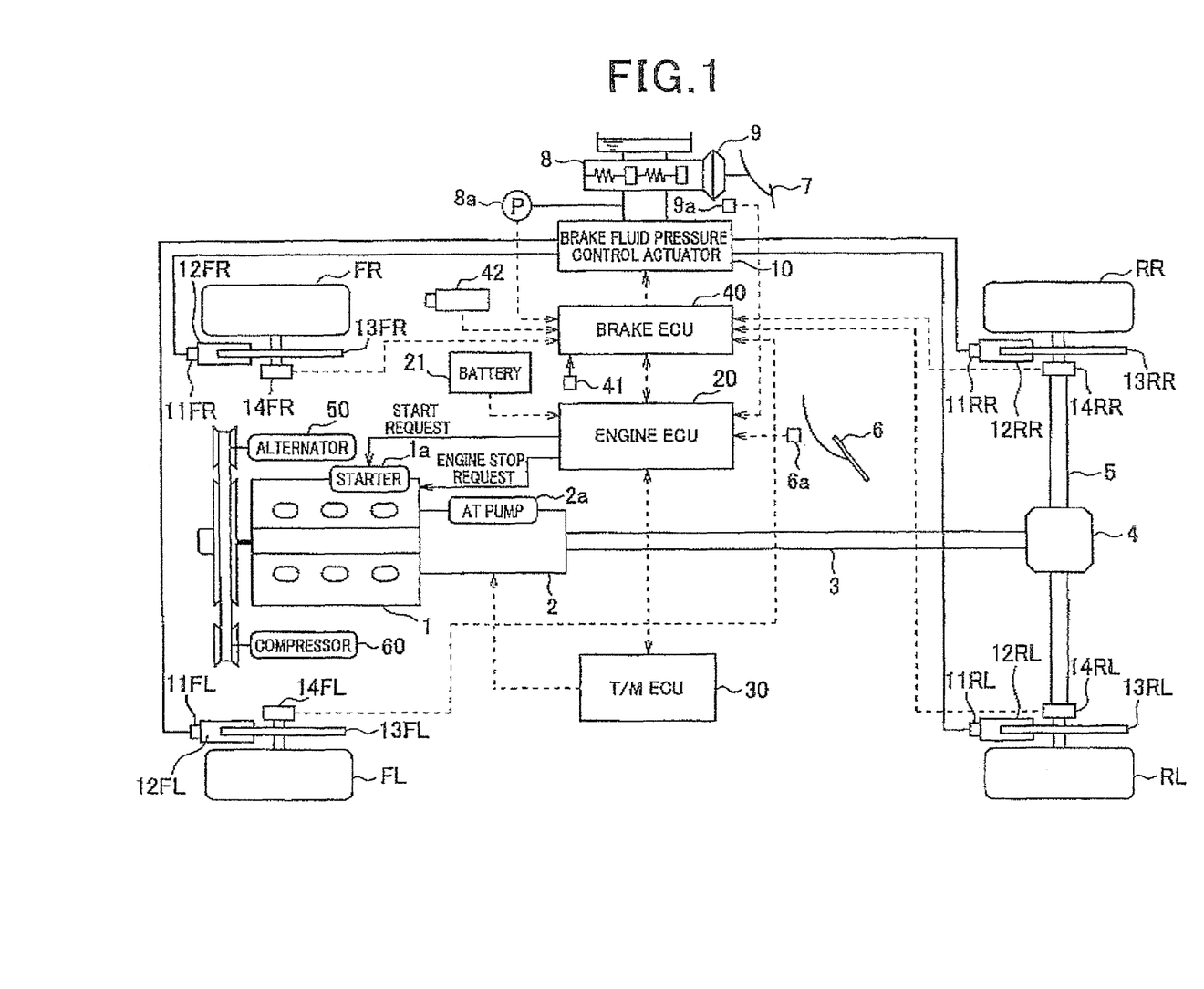
FIG. 1 is a diagram illustrating the general configuration of a vehicle control system to which a vehicle control apparatus according to an embodiment of the present invention is applied.

FIG. 1 is a diagram illustrating the general configuration of a vehicle control system to which a vehicle control apparatus according to the embodiment of the present invention is applied.

Specifically, the vehicle control apparatus of the embodiment is applied to an FR (front-engine rear-wheel drive) vehicle, in which an engine is installed in the front, and RR (rear-right) and RL (rear-left) wheels are used as drive wheels. However, in a similar manner, the vehicle control apparatus of the embodiment may be applied, for example, to an FF (front-engine front-wheel drive) vehicle that uses FR (front-right) and FL (front-left) wheels as drive wheels.

As shown in FIG. 1, a drive system of the FR vehicle includes such components as an engine 1, a transmission 2, a propeller shaft 3, a differential gear 4, a drive shaft 5 and an accelerator pedal 6. Drive force is transmitted to rear wheels RR (rear-right) and RL (rear-left), which serve as drive wheels, via these components. Specifically, an engine output (engine torque) generated based on a manipulated variable of the accelerator pedal 6 is transmitted to the transmission 2. The transmitted engine output is then subjected to conversion based on a gear ratio corresponding to a gear position set by the transmission 2. Then, the converted engine output is transmitted to the propeller shaft 3 as a drive force. The drive force is then transmitted to the rear wheels RR and RL via the drive shaft 5 connected to the propeller shaft 3 via the differential gear 4.

A brake system of the FR vehicle includes a brake pedal 7, a master cylinder (M/C) 8 and a brake booster. 9. The brake system generates a brake fluid pressure in the master cylinder 8 in response to a manipulated variable of the brake pedal 7 and transmits the brake fluid pressure to the wheels FR, FL, RR and RL to cause a braking force. The brake booster 9 is provided between the brake pedal 7 and the master cylinder 8. The brake booster 9 has a function of intensifying a pedal pressure applied to the brake pedal 7 using the negative pressure (this function is hereinafter referred to "boost-with-negative pressure function") caused by an intake stroke of an engine. Based on the intensified pedal pressure, a high pressure is caused in the master cylinder 8 (this pressure is hereinafter referred to as "M/C pressure").

The brake system also includes an actuator 10 for controlling brake fluid pressure (hereinafter also just referred to as "actuator 10"), as well as wheel cylinders 11FR, 11FL, 11RR and 11RL, calipers 12FR, 12FL, 12RR and 12RL, and disc rotors 13FR, 13FL, 13RR and 13RL, which are provided to the wheels FR, FL, RR and RL, respectively. A brake fluid pressure applied to the wheel cylinders 11FR, 11FL, 11RR and 11RL (this pressure is hereinafter referred to as "W/C pressure") is controlled by the actuator 10. Meanwhile, the calipers 12FR, 12FL, 12RR and 12RL are provided with respective brake pads which press/hold the respective disc rotors 13FR, 13FL, 13RR and 13RL. Under the control of the actuator 10, the holding/pressing force of the individual brake pads is adjusted to thereby control the braking force of the wheels FR, FL, RR and RL.

For example, the actuator 10 is configured by various control valves for intensifying, retaining or reducing pressure of the wheel cylinders 11FR, 11FL, 11RR and 11RL, a reservoir for accommodating brake fluid in the wheel cylinders 11FR, 11FL, 11RR and 11RL when the pressure of the wheel cylinders is reduced, a pump for returning the brake fluid accommodated in the reservoir to the side of the master cylinder 8 and a motor for actuating the pump.

When braking is normally applied with this configuration, the actuator 10 allows the master cylinder 8 to be connected to the wheel cylinders 11FR, 11FL, 11RR and 11RL, so that a braking force equivalent to the manipulated variable (amount of stroke or pedal pressure) of the brake pedal 7 is caused in the wheels FR, FL, RR and RL. When the actuator 10 automatically increases the W/C pressure, accompanying the decrease of the vacuum pressure, a differential pressure control valve disposed between the master cylinder 8 and the wheel cylinders 11FR, 11FL, 11RR and 11RL is allowed to exert differential pressure control, while the pump is allowed to actuate with the actuation of the motor.

The value of a differential pressure caused by the differential pressure control valve is controlled by the value of current passed to the differential pressure control valve. Using the pump, the brake fluid is charged from the side of the master cylinder 8 via a pipe connecting the master cylinder 8 and the reservoir to discharge the brake fluid to the wheel cylinders 11FR, 11FL, 11RR and 11RL located downstream of the differential pressure control valve.

Thus, the W/C pressure is raised higher than the M/C pressure by the amount equivalent to the differential pressure caused by the differential pressure control valve. In this way, the function of automatically increasing the W/C pressure is ensured to compensate the lowering of the boost-with-negative pressure function, the lowering being caused by the decrease of the vacuum pressure.

A general structure of an actuator for controlling brake fluid pressure, with which the WIC pressure is automatically increased, is well known as disclosed in JP-A-2006-298185, for example. Therefore, the specific explanation is omitted.

The vehicle control system of the present embodiment also includes an engine controller 20 (hereinafter referred to as "engine ECU 20") and a transmission controller 30 (hereinafter referred to as "T/M ECU 30") for controlling the drive system, as well as a brake controller 40 (hereinafter referred to as "brake ECU 40") for controlling the brake system.

The engine ECU 20 basically performs control of the engine 1. In the present embodiment, however, the engine ECU 20 also has a function of performing idle stop control (hereinafter referred to as "IS control"). In the present embodiment, the engine ECU 20 is integrated with the brake ECU 40, which will be described later, to configure an apparatus for controlling automatic stop and restart of an engine.

The engine ECU 20 is configured by a well-known microcomputer that includes a CPU, a ROM, a RAM and an I/O. The engine ECU 20 performs various calculations and processes according to a program stored such as in the ROM to control the engine output (engine torque) and to thereby control the drive force generated in the rear wheels RR and RL.

For example, the engine ECU 20 inputs a manipulated variable of the accelerator pedal 6 with a detection signal of a pedal sensor 6a and regulates a fuel injection device based on the manipulated variable of the accelerator pedal 6 to thereby regulate the fuel injection quantity. Thus, the engine output is controlled to thereby control the drive force.

Also, in the present embodiment, the engine ECU 20 also performs IS control. Thus, the engine ECU 20 outputs an engine stop request to the engine 1, while outputting an engine start request (starter drive signal ON) to a starter 1*a*. The engine stop request and the engine start request are each outputted when various conditions are met. The various conditions will be described later.

Further, the engine ECU 20 inputs a request for starting an AT (automatic transmission) pump 2*a* (hereinafter referred to "AT pump start request") from the T/M ECU 30, while inputting brake/vehicle speed information from the brake ECU 40. The AT pump 2*a* has a function of driving the transmission 2 which is driven when the engine 1 is driven. When the AT pump 2*a* is driven, the engine 1 is necessarily required to be driven. Therefore, it is ensured that the AT pump start request is outputted from the T/M ECU 30 to the engine ECU 20, so that a start request for the engine 1 is outputted via the engine ECU 20.

In addition, as conditions for outputting an engine stop request under IS control, the engine ECU 20 uses such information as brake pressure and vehicle speed, as will be described later. Accordingly, brake information including brake pressure and vehicle speed is transmitted from the brake ECU 40 to the engine ECU 20 for use under IS control.

The engine ECU 20 inputs information associated with the voltage of a battery 21 (battery voltage). The battery voltage is also used as a condition for outputting an engine start request under IS control. Accordingly, the information on the battery voltage is ensured to be inputted to the engine ECU 20 for use under IS control.

The engine ECU 20 also acquires information associated with vacuum pressure by inputting a detection signal from a negative pressure sensor 9*a*. Based on the information associated with the vacuum pressure, the engine ECU 20 restarts the engine 1 or boosts braking force (performs braking boost) with the automatic increase of the W/C pressure.

The T/M ECU 30 is configured by a well-known microcomputer that includes a CPU, a ROM, a RAM and an I/O. The T/M ECU 30 performs various calculations and processes according to a program stored such as in the ROM to make a selection, for example, of a gear position of the transmission 2.

The T/M ECU 30 exchanges information with the engine ECU 20 to transmit the gear position of the transmission 2 to the engine ECU 20. Thus, the engine ECU 20 calculates an engine output, taking into account the gear position of the transmission 2 in the information transmitted from the T/M ECU 30 in addition to the manipulated variable of the accelerator pedal 6. Also, the T/M ECU 30 outputs an AT pump start request when actuating the AT pump 2*a* and informs the engine ECU 20 accordingly.

The brake ECU 40 is configured by a well-known microcomputer that includes a CPU, a ROM, a RAM and an I/O. The brake ECU 40 performs various calculations and processes according to a program stored such as in the ROM to cause optional braking force to the individual wheels FR, FL, RR and RL.

The brake ECU 40 also performs various calculations based on detection signals from various sensors. For example, the brake ECU 40 allows a pressure sensor 8*a* to detect the M/C pressure in the master cylinder 8, which is generated in response to the manipulated variable of the brake pedal 7, and performs temporal differentiation of the M/C pressure to thereby calculate a rate of brake pressure change.

Further, the brake ECU 40 receives detection signals from wheel speed sensors 14FR, 14FL, 14RR and 14RL provided at the wheels FR, FL, RR and RL, respectively, to calculate wheel speeds of the individual wheels. At the same time, the brake ECU 40 calculates an estimated vehicle speed (hereinafter just referred to as "vehicle speed") based on the calculated wheel speeds, using a well-known method. The vehicle speed is also used for the calculation of a slip ratio (slip ratio=(vehicle speed−wheel speeds)/vehicle speed), which is used for performing control by anti-skid braking system (ABS control), for example, performed by the brake ECU 40. The ABS control is omitted from explanation.

Although not specifically illustrated in FIG. 1, it is so configured that other start requests, including the AT pump start request, are inputted to the engine ECU 20 from various ECUs. The start requests are different from those based on brake pressure.

Specifically, when a device actuated by the engine 1 is used, the engine 1 has to be restarted. In this case, a start request from an ECU that controls the device in question is inputted to the engine ECU 20. For example, as shown in FIG. 1, an alternator 50 actuated for charging the battery 21 and a compressor 60 actuated in using an air conditioner are actuated by the engine 1. Accordingly, the engine 1 has to be restarted when the alternator 50 or the compressor 60 is actuated. Therefore, for example, a start request is outputted from a power supply ECU that controls the alternator 50 or an air conditioner ECU that controls the air conditioner. Thus, it is ensured that start requests besides the start requests based on brake pressure are inputted to the engine ECU 20.

The vehicle control system is configured as described above, being provided with the apparatus for controlling automatic stop and restart of an engine. The apparatus performs IS control.

Figure 2:
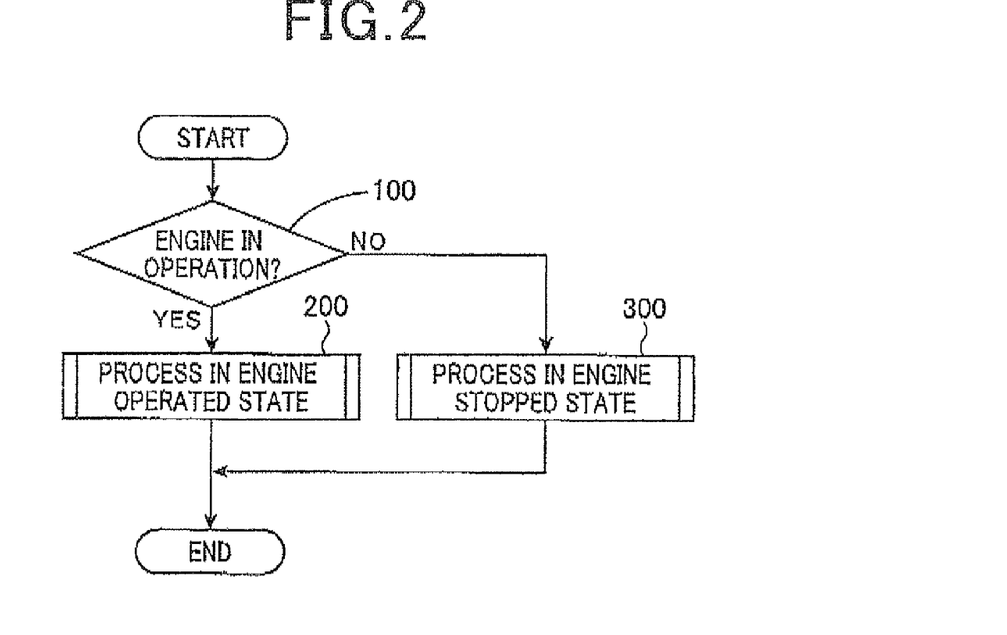
FIG. 2 is a flow diagram illustrating the process of idle stop control (IS control) performed by an engine ECU.
Figure 3:
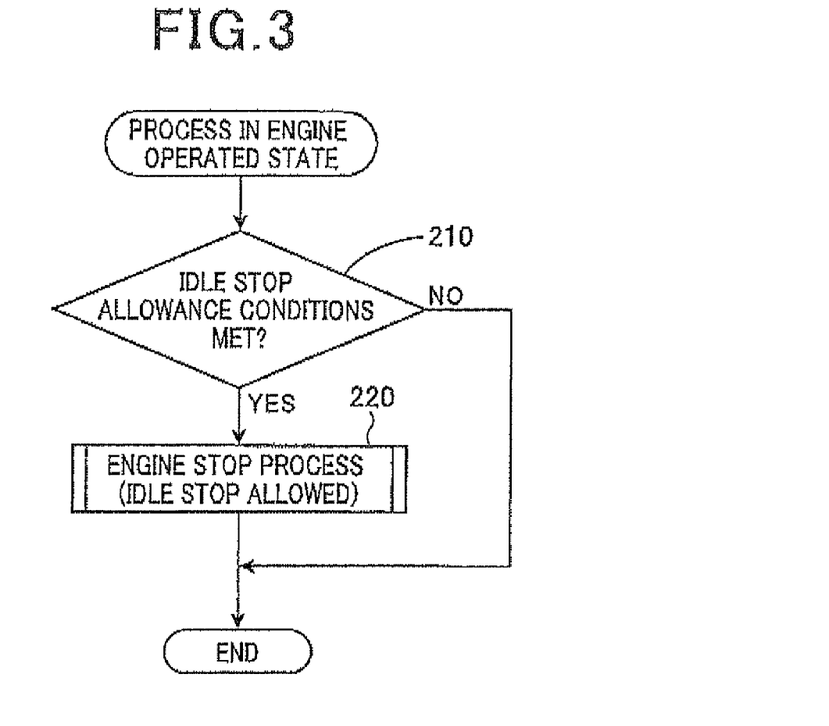
FIG. 3 is a flow diagram illustrating a process in an engine operated state indicated in FIG. 2.
Figure 4:
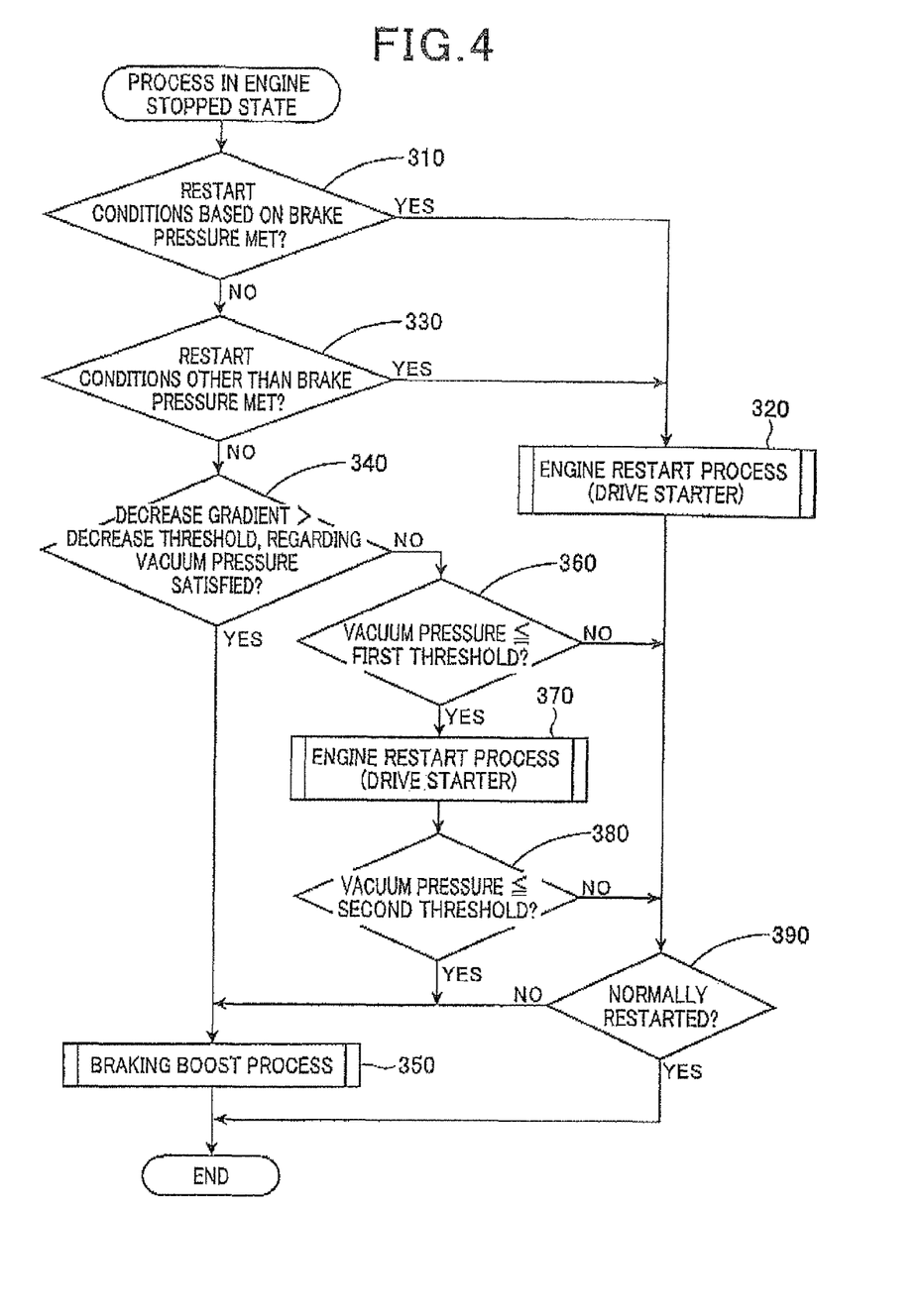
FIG. 4 is a flow diagram illustrating a process in an engine stopped state indicated in FIG. 2.

Referring now to FIGS. 2 to 4, hereinafter is described IS control performed by the vehicle control system of the present embodiment.

FIGS. 2 to 4 are flow diagrams illustrating processes of IS control performed by the engine ECU 20 of the present embodiment, which functions as the apparatus for controlling automatic stop and restart of an engine. The processes illustrated in these figures are performed at a predetermined control cycle when an ignition switch, not shown, is turned on.

First, in step 100, it is determined whether or not an engine is in operation. The engine 1 is in a stopped state when, with the ignition switch being in an on-state, the engine ECU 20 has outputted an engine stop request to stop the engine 1 and when, thereafter, the engine 1 has not been restarted with the output of a start request. Also, when the engine speed is equal to or more than a predetermined engine speed that is estimated as indicating idling, the engine 1 is in operation. Since the engine ECU 20 itself deals with these pieces of information, the engine ECU 20 can determine whether or not the engine is in operation based on any one of these pieces of information.

Then, when an affirmative determination is made in step 100, control proceeds to step 200 where a process in an engine operated state is performed. When a negative determination is made in step 100, control proceeds to step 300 where a process in an engine stopped state is performed.

FIG. 3 is a flow diagram illustrating the process in an engine operated state. Referring to FIG. 3, the process in an engine operated state is explained.

First, in step 210, it is determined whether or not idle stop allowance conditions have been met. The "idle stop allowance conditions" refer to those conditions which are determined as conditions for allowing idle stop. For example, the idle stop allowance conditions include that the accelerator pedal is released and the vehicle speed is equal to or less than a predetermined speed (e.g., 10 km/h), that the battery voltage is maintained (battery voltage is equal to or more than a threshold), and that the brake pressure is equal to or more than a threshold.

The condition that the accelerator pedal is released and the vehicle speed is equal to or less than a predetermined speed means that the driver intends to stop the vehicle. The state of the accelerator pedal being released is detected based on a detection signal from the pedal sensor 6a, which detect the manipulated variable of the accelerator pedal 6. The vehicle speed is acquired from the brake ECU 40. Idle stop is performed when the driver stops the vehicle to improve fuel consumption. Therefore, it is not preferable to perform idle stop when the vehicle will not be stopped but will continue traveling without being stopped. This is the reason for making it a condition that the accelerator pedal is released and the vehicle speed is equal to or less than a predetermined speed.

The condition that the battery voltage is maintained means that, when idle stop is performed, the vehicle is not in a state where the engine ECU 20 has to restart the engine 1 for the recovery of the battery voltage. In other words, when the battery voltage has been decreased, a start request is likely to be outputted to actuate the alternator 50, and thus the engine 1 is likely to be restarted. In this case, the controllability of the ABS control may no longer be ensured. This is the reason for making it a condition that the battery voltage is maintained. Whether or not the voltage of the battery 21 is maintained is determined by determining whether or not the voltage of the battery 21 is equal to or more than a threshold.

The condition that the brake pressure is equal to or more than a threshold means that the driver intends to apply braking. The brake pressure is acquired from the brake ECU 40. When the driver does not intend to stop the vehicle, idle stop does not have to be performed. Therefore, a threshold pressure of the brake pressure is set to a level at which the vehicle is decelerated and the driver is expected to have an intention of applying braking. This is the reason for making it a condition that the detected brake pressure is equal to or more than a threshold.

When a negative determination is made in step 210, the process is immediately ended. When an affirmative determination is made in step 210, control proceeds to step 220. In step 220, idle stop is allowed as an engine stop process. Thus, the engine ECU 20 outputs an engine stop request, so that the engine 1 is stopped. Accordingly, the fuel injection device regulates the fuel injection quantity to be zero, whereby fuel consumption is improved. Through the steps described above, the process in an engine operated state is completed.

FIG. 4 is a flow diagram illustrating a process in an engine stopped state. Referring to FIG. 4, hereinafter is described the process in an engine stopped state.

In step 310, first, it is determined whether or not restart conditions based on brake pressure have been met. The term "restart conditions based on brake pressure" refers to the brake pressure having been decreased by the driver's release of the brake pedal 7, or by the driver's reducing the foot pressure applied to the brake pedal 7 to an extent which is interpreted such that the driver has no intention of applying braking. Specifically, in step 310, the restart conditions based on brake pressure are regarded to be satisfied when the brake pressure has become equal to or less than a release threshold that is a threshold which is smaller than the threshold pressure mentioned above.

When an affirmative determination is made in step 310, the brake is expected to be released and thus control proceeds to step 320 where an engine restart process is performed. Thus, a start request is outputted from the engine ECU 20 to the starter 1a, so that the engine 1 is restarted.

When a negative determination is made in step 310, control proceeds to step 330 where it is determined whether or not a restart request originated from a different matter than brake pressure has been made. The "restart request originated from a different matter than brake pressure" refers to such a start request as an AT pump start request. When there is such a restart request originated from a different matter than brake pressure, control also proceeds to step 320 to perform the restart process. Thus, a start request is outputted from the engine ECU 20 to the starter 1a, so that the engine 1 is restarted. Thus, the process in an engine stopped state is completed.

When a negative determination is made in step 330 as well, control proceeds to step 340 where it is determined whether or not a decrease gradient of the vacuum pressure exceeds a preset decrease threshold. The decrease threshold is set to a value at which the vacuum pressure is consumed quickly and braking boost by the automatic increase of the W/C pressure is assumed to be desirable. When the vacuum pressure is consumed quickly, the braking force is highly likely to be lowered. Therefore, when the decrease gradient of the vacuum pressure exceeds the decrease threshold, control proceeds to step 350, where a braking boost process is performed.

Thus, the brake ECU 40 controls the actuator 10 for controlling brake fluid pressure, allows the differential pressure control valve to exert differential pressure control and drives the motor for driving the pump to discharge brake fluid from the side of the master cylinder 8 to the side of the wheel cylinders 11FR, 11FL, 11RR and 11RL, thereby performing the automatic pressure application for increasing the W/C pressure. In this way, braking boost is performed to compensate the decrease of the vacuum pressure by automatically applying pressure for the increase of the W/C pressure.

On the other hand, when a negative determination is made in step 340, control proceeds to step 360 to determine whether or not the vacuum pressure is equal to or less than a first threshold. The first threshold is a negative pressure value at which the vacuum pressure is assumed to be lowered to an extent of requiring restart of the engine 1. When a negative determination is made in step 360, the present process is immediately ended. When an affirmative determination is made in step 360, control proceeds to step 370 to perform an engine restart process. Thus, an engine restart request is outputted (starter driver signal ON) to the starter 1a from the engine ECU 20, so that the engine 1 is restarted.

Then, control proceeds to step 380 to determine whether or not the vacuum pressure is equal to or less than a second threshold. The second threshold is set to a value lower than the first threshold mentioned above. The second threshold is a negative value indicating that the vacuum pressure has been lowered to an extent that lowering of braking force may occur.

Specifically, although engine restart is performed in step 370, it may take time before the engine is actually restarted, or, if the engine 1 has been restarted, the vacuum pressure is not immediately recovered. Therefore, before being recovered, the vacuum pressure may become equal to or less than the second threshold. Thus, when an affirmative determination is made in step 380, control proceeds to step 350 to perform a braking boost process. Thus, the brake ECU 40 controls the actuator 10 to increase the W/C pressure. In this way, braking boost can be performed for compensating the decrease of the vacuum pressure by automatically increasing the W/C pressure.

On the other hand, when a negative determination is made in step 380, control proceeds to step 390 to determine whether or not the engine 1 is normally restarted. For example, in the case of normal restart, the engine speed reaches a predetermined value within a predetermined time frame from when the engine restart process has been performed in step 370.

However, when the engine speed does not reach the predetermined value within the predetermined time frame, it is assumed that the engine has not been normally started.

When a negative determination is made in step 390, control proceeds to step 350 to perform the braking boost process to cope with the possible long-time recovery of the vacuum pressure with the engine restart, although the vacuum pressure may not have become equal to or less than the second threshold. Thus, the brake ECU 40 controls the actuator 10 to increase the W/C pressure. In this way, braking boost can be performed for compensating the decrease of the vacuum pressure by automatically increasing the W/C pressure. Thus, the process in an engine stopped state is completed.

Figure 5:
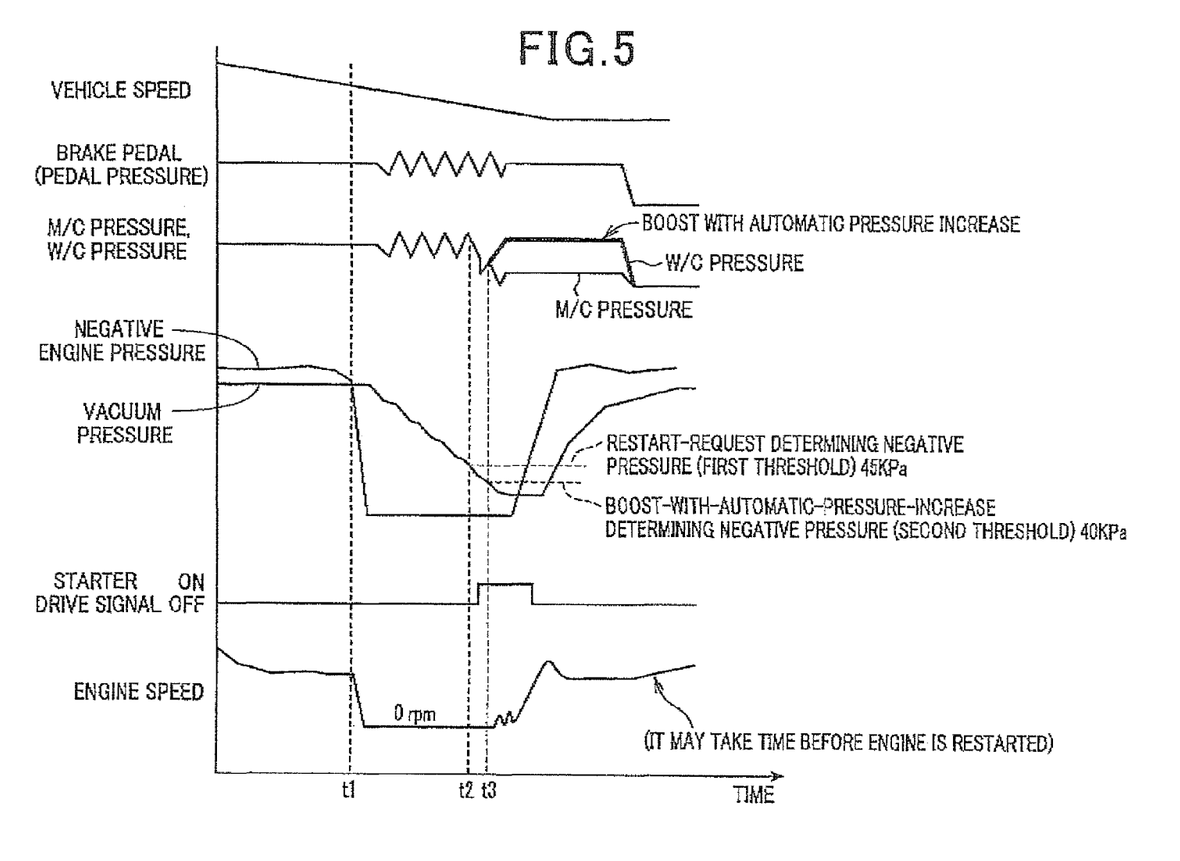
FIG. 5 is a timing diagram illustrating the case where the process of IS control is performed.

FIG. 5 is a timing diagram illustrating the case where the IS control as described above is performed. As shown in FIG. 5, when the brake pedal 7 is pressed by the driver to lower the vehicle speed, the idle stop allowance conditions are met at a time point t1. Then, the engine 1 is stopped to reduce the engine speed to zero and also to reduce the negative engine pressure to zero, which is caused by an intake stroke of the engine 1. Then, when the brake pedal 7 is frequently pressed by the driver, the negative brake pressure is gradually lowered with the applications of the braking. Then, at a time point t2 when the negative brake pressure becomes lower than the first threshold (e.g., 45 KPa), the engine restart process is performed to restart the engine 1. Thus, the engine 1 is restarted.

However, when long time is taken before the engine 1 is restarted and thus the negative brake pressure has become equal to or less than the second threshold (e.g., 40 KPa) at a time point t3, the braking boost process is performed. Thus, the W/C pressure is increased by the actuator 10. In this way, braking boost is performed for compensating the decrease of the vacuum pressure by automatically increasing the W/C pressure.

As described above, two thresholds are set in the above embodiment, which are the first threshold for restarting an engine, and a second threshold for performing braking boost. The vacuum pressure is compared with the first and second thresholds. When the vacuum pressure becomes equal to or less than the first threshold, the engine 1 is restarted. When the vacuum pressure becomes equal to or less than the second threshold, braking boost is performed.

Thus, the vacuum pressure, when it is lowered, is recovered by restarting the engine 1. Meanwhile, the recovery of the vacuum pressure suppresses lowering of braking force that accompanies the lowering of the boost-with-negative pressure function which is caused by the lowering of the vacuum pressure. Accordingly, if the engine is stopped under the IS control not only when the vehicle is stopped but also when the vehicle is decelerated, lowering of braking force is suppressed, which is caused by the lowering of the vacuum pressure.

Two thresholds, i.e. the first and second thresholds, are set as mentioned above, with the first threshold for restarting the engine being made larger than the second threshold for performing braking boost. Thus, priority is given to the restart of the engine 1. Nevertheless, when the vacuum pressure is insufficient, braking boost is ensured to be performed. In this way, the following advantages can be enjoyed.

Specifically, when durability of the actuator 10 is taken into account, it is preferable that braking boost is ensured not to be performed frequently. Therefore, the frequency of performing braking boost is reduced by establishing the above large-and-small relationship between the first and second thresholds, whereby durability of the actuator 10 can be ensured.

The values of the first and second thresholds may be the same. However, setting the same values means that engine restart and braking boost are simultaneously performed, and thus the electrical power for realizing both of them will be extremely large. Therefore, making the values between the first and second thresholds different, the timing for performing engine restart and braking boost is made different. As a result, extremely large voltage is prevented from being required.

(Modifications)

In the above embodiment, a fixed value has been assigned to each of the first and second thresholds. However, these values may be made variable according to the states of the vehicle. For example, each of the first and second thresholds may be set to a larger value as the vehicle speed becomes higher. Specifically, as the vehicle speed becomes higher, the influence caused by the lowering of braking force becomes larger. Therefore, it is desirable that the vacuum pressure is recovered at an earlier stage. Also, it is preferable that braking force is ensured by performing braking boost at an earlier stage. Therefore, by setting each of the first and second thresholds to a higher value as the vehicle speed becomes higher, engine restart and braking boost are permitted to be performed at earlier timing.

The first and second thresholds may be made variable according to the gradient of the road surface. For example, in the case of a road surface gradient corresponding to an upward slope, the second threshold may be decreased so that braking boost is unlikely to be performed. In the case of a road surface gradient corresponding to a downward slope, the second threshold may be increased so that braking boost is easily performed. Specifically, in the case of an upward slope, deceleration is easily applied and thus sufficient braking force is easily caused without performing braking boost. In the case of a downward slope, deceleration is unlikely to be applied and thus sufficient braking force is unlikely to be caused without performing braking boost.

For this reason, it is preferable that the second threshold is made variable depending on the road surface gradient so that a higher value is assigned in traveling a downward slope than in traveling an upward slope. The road surface gradient can be detected by a known technique. For example, as shown in FIG. 1, a detection signal derived from a longitudinal acceleration sensor 41 may be inputted to the brake ECU 40. Then, using a known technique, a road surface gradient may be detected based on the magnitude of a gravity acceleration component included in the detection signal derived from the longitudinal acceleration sensor 41.

The steps indicated in the drawings correspond to respective means for performing variable processes. For example, the components that perform the processing of steps 100 to 300 correspond to the automatic stop and restart control means. The component that performs the processing of step 220 corresponds to the stopping means. The component that performs the processing of step 340 corresponds to the decrease gradient determining means. The component that performs the processing of step 350 corresponds to the braking boosting means. The component that performs the processing of step 360 corresponds to the first determining means. The component that performs the processing of step 370 corresponds to the restarting means. The component that performs the processing of step 380 corresponds to the second determining means. The component that performs the processing of step 390 corresponds to the restart determining means.

In the embodiment described above, the functioning components that perform various processes have been disposed in the engine ECU 20. However, these components may not necessarily be disposed in the engine ECU 20. For example, these functioning components may all be disposed in an ECU for performing IS control provided separately from the engine ECU 20. As a matter of course, the functioning components may be distributed to a plurality of ECUs, because an in-vehicle LAN enables transmission and reception of various data.

Hereinafter, aspects of the above-described embodiments will be summarized.

As an aspect of the embodiment, a vehicle control apparatus includes: an automatic stop and restart control unit (100-300) which stops and restarts an engine (1) of a vehicle; a brake fluid pressure control unit controlling wheel cylinder pressure by using a brake system, which intensifies brake manipulation force by a brake booster (9) to cause master cylinder pressure in a master cylinder (8) while the engine (1) is in operation, the brake booster (9) generating vacuum pressure, and which transfers the master cylinder pressure to wheel cylinders (11FR-11RL) to cause the wheel cylinder pressure, the brake system including an actuator (10) which automatically increases pressure in the wheel cylinders (11FR-11RL) irrespective of the brake manipulation force; a negative pressure detection unit which detects the vacuum pressure; a first determination unit (360) which determines whether or not the vacuum pressure detected by the negative pressure detection unit is equal to or less than a first threshold while the engine (1) is stopped; a restarting unit (370) which allows the automatic stop and restart control unit (100-300) to restart the engine (1) when the first determination unit (360) determines that the vacuum pressure is equal to or less than the first threshold; a second determination unit (380) which determines whether or not the vacuum pressure detected by the negative pressure detection unit is equal to or less than a second threshold; and a braking boost unit (350) which allows the brake fluid pressure control unit to automatically increase the pressure in the wheel cylinders (11FR-11RL) when the second determination unit (380) determines that the vacuum pressure is equal to or less than the second threshold.

Thus, two thresholds having a different value are set, the two thresholds being the first threshold for restarting an engine (1) and the second threshold for performing braking boost, for comparison of the vacuum pressure with the first and second thresholds. When the vacuum pressure becomes equal to or less than the first threshold, the engine (1) is ensured to be restarted. When the vacuum pressure becomes equal to or less than the second threshold, braking boost is ensured to be performed.

Thus, the vacuum pressure, when it is lowered, is recovered by restarting the engine (1). Meanwhile, the recovery of the vacuum pressure suppresses lowering of braking force that accompanies the lowering of a boost-with-negative pressure function which is caused by the lowering of the vacuum pressure. Accordingly, if the engine (1) is stopped under the IS control not only when the vehicle is stopped but also when the vehicle is decelerated, lowering of braking force is suppressed, which is caused by the lowering of the vacuum pressure.

In the vehicle control apparatus, the first threshold is set to a value higher than the second threshold. When the vacuum pressure is lowered, the restarting unit (370) restarts the engine (1) before the braking boost unit (350) automatically increases the pressure in the wheel cylinders (11FR-11RL).

Specifically, when durability of the actuator (10) for controlling brake fluid pressure is taken into account, it is preferable that braking boost is ensured not to be performed frequently. Therefore, the frequency of performing braking boost is reduced by setting the first threshold to a value larger than the second threshold, whereby durability of the actuator (10) for controlling brake fluid pressure can be ensured.

The values of the first and second thresholds may be the same. However, setting the same values means that engine restart and braking boost are simultaneously performed, and thus the electrical power for realizing both of them will be extremely large. Therefore, making the values between the first and second thresholds different, the timing for performing engine restart and braking boost is made different. As a result, extremely large voltage is prevented from being required.

The vehicle control apparatus further includes a decrease gradient determining unit (340) which determines whether or not a decrease gradient of the vacuum pressure detected by the negative pressure detection unit is larger than a predetermined decrease threshold. When is the decrease gradient determining unit (340) determines that the decrease gradient is larger than the decrease threshold, the braking boost unit automatically increases the pressure in the wheel cylinders (11FR-11RL).

Thus, when a decrease gradient of the vacuum pressure is relatively large, the vacuum pressure is consumed fast and thus the braking force is highly likely to be lowered. Accordingly, it is desirable that braking boost is performed by automatic application of pressure. Therefore, when the decrease gradient is larger than the decrease threshold, braking boost is performed to thereby more reliably suppress lowering of braking force.

The vehicle control apparatus further includes a restart determining unit (390) which determines whether or not the engine (1) is normally restarted when the restarting unit (370) restarts the engine (1). When the restart determining unit (390) determines that the engine (1) is not normally restarted, the braking boost unit (350) automatically increases the pressure in the wheel cylinders (11FR-11RL).

Thus, when an engine is not normally restarted, it may take time before the vacuum pressure is recovered by the restart of the engine (1), even when the vacuum pressure has not become equal to or less than the second threshold. In this case as well, the wheel cylinders (11FR-11RL) may preferably be automatically applied with pressure by the braking boost unit (350).

In the vehicle control apparatus, each of the first and second thresholds is set to a higher value as speed of the vehicle becomes higher.

Specifically, as the vehicle speed becomes higher, the influence caused by the lowering of braking force becomes larger. Therefore, it is desirable that the vacuum pressure is recovered at an earlier stage. Also, it is preferable that braking force is ensured by performing braking boost at an earlier stage. Therefore, by setting each of the first and second thresholds to a higher value as the vehicle speed becomes higher, engine restart and braking boost are permitted to be performed at earlier timing.

In the vehicle control apparatus, the second threshold is made variable depending on a road surface gradient so that a higher value is assigned in traveling a downward slope than in traveling an upward slope.

Specifically, in the case of an upward slope, deceleration is easily applied and thus sufficient braking force is easily caused without performing braking boost. In the case of a downward slope, deceleration is unlikely to be applied and thus sufficient braking force is unlikely to be caused without performing braking boost. For this reason, it is preferable that the second threshold is made variable depending on the road surface gradient so that a higher value is assigned in traveling a downward slope than in traveling an upward slope.

It will be appreciated that the present invention is not limited to the configurations described above, but any and all modifications, variations or equivalents, which may occur to those who are skilled in the art, should be considered to fall within the scope of the present invention.

What is claimed is:

1. A vehicle control apparatus, comprising:
    an automatic stop and restart control unit which stops and restarts an engine of a vehicle;
    a brake fluid pressure control unit controlling wheel cylinder pressure by using a brake system, which intensifies brake manipulation force by a brake booster to cause master cylinder pressure in a master cylinder while the engine is in operation, the brake booster generating vacuum pressure, and which transfers the master cylinder pressure to wheel cylinders to cause the wheel cylinder pressure, the brake system including an actuator which automatically increases pressure in the wheel cylinders irrespective of the brake manipulation force;
    a negative pressure detection unit which detects the vacuum pressure;
    a first determination unit which determines whether or not the vacuum pressure detected by the negative pressure detection unit is equal to or less than a first threshold while the engine is stopped;
    a restarting unit which allows the automatic stop and restart control unit to restart the engine when the first determination unit determines that the vacuum pressure is equal to or less than the first threshold;
    a second determination unit which determines whether or not the vacuum pressure detected by the negative pressure detection unit is equal to or less than a second threshold; and
    a braking boost unit which allows the brake fluid pressure control unit to automatically increase the pressure in the wheel cylinders when the second determination unit determines that the vacuum pressure is equal to or less than the second threshold.

2. The vehicle control apparatus according to claim 1, wherein
    the first threshold is set to a value higher than the second threshold, and
    when the vacuum pressure is lowered, the restarting unit restarts the engine before the braking boost unit automatically increases the pressure in the wheel cylinders.

3. The vehicle control apparatus according to claim 1, further comprising a decrease gradient determining unit which determines whether or not a decrease gradient of the vacuum pressure detected by the negative pressure detection unit is larger than a predetermined decrease threshold, wherein
    when the decrease gradient determining unit determines that the decrease gradient is larger than the decrease threshold, the braking boost unit automatically increases the pressure in the wheel cylinders.

4. The vehicle control apparatus according to claim 1, further comprising a restart determining unit which determines whether or not the engine is normally restarted when the restarting unit restarts the engine, wherein
    when the restart determining unit determines that the engine is not normally restarted, the braking boost unit automatically increases the pressure in the wheel cylinders.

5. The vehicle control apparatus according to claim 1, wherein
    each of the first and second thresholds is set to a higher value as speed of the vehicle becomes higher.

6. The vehicle control apparatus according to claim 1, wherein
    the second threshold is made variable depending on a road surface gradient so that a higher value is assigned in traveling a downward slope than in traveling an upward slope.

* * * * *